3,748,120
METHOD OF AND APPARATUS FOR REDUCING IRON OXIDE TO METALLIC IRON
Donald Beggs and John C. Scarlett, Toledo, Ohio, assignors to Midland-Ross Corporation, Toledo, Ohio
Continuation of abandoned application Ser. No. 739,377, June 24, 1968. This application Apr. 15, 1971, Ser. No. 134,476
Int. Cl. C21b 13/02
U.S. Cl. 75—35                         6 Claims

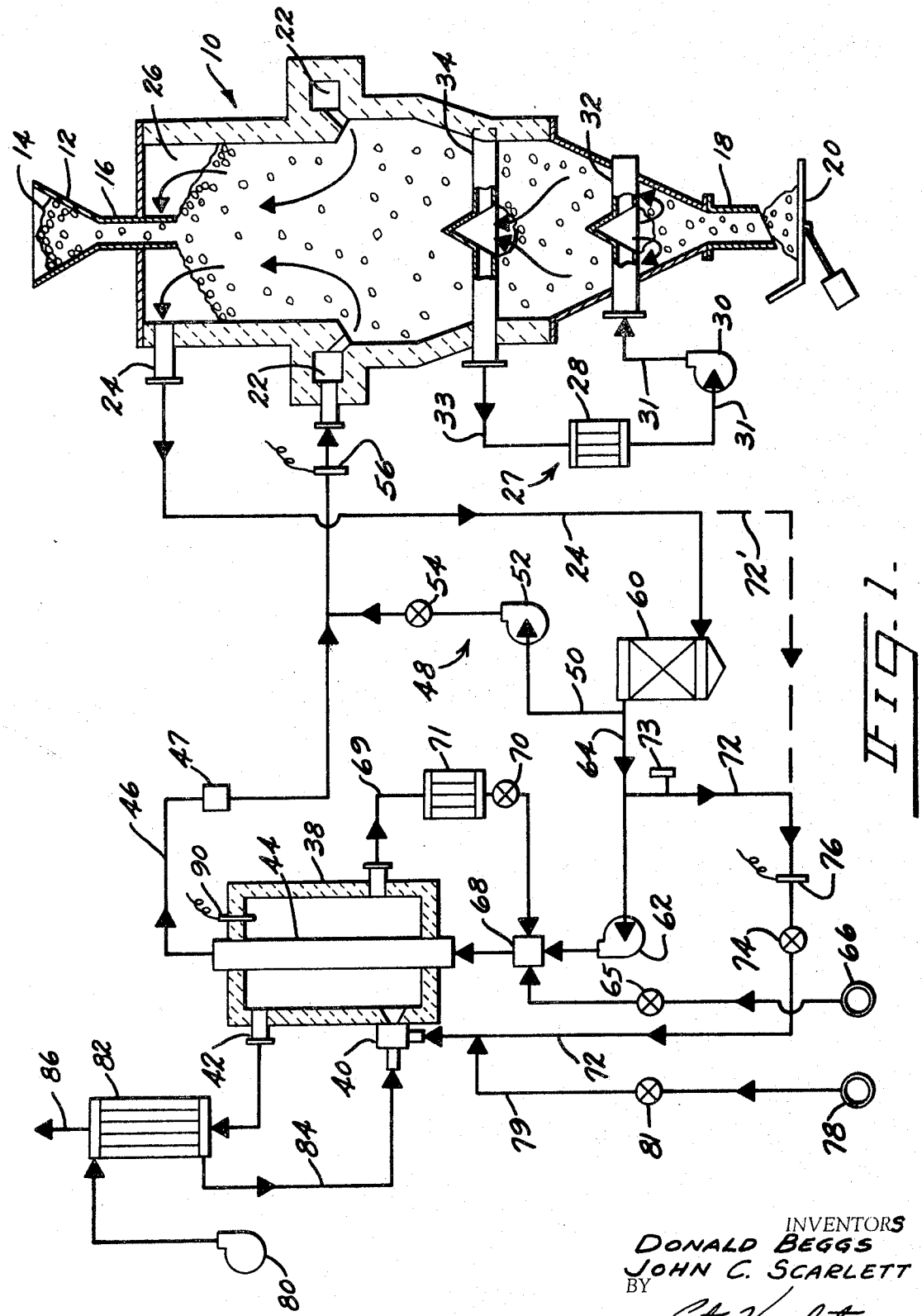

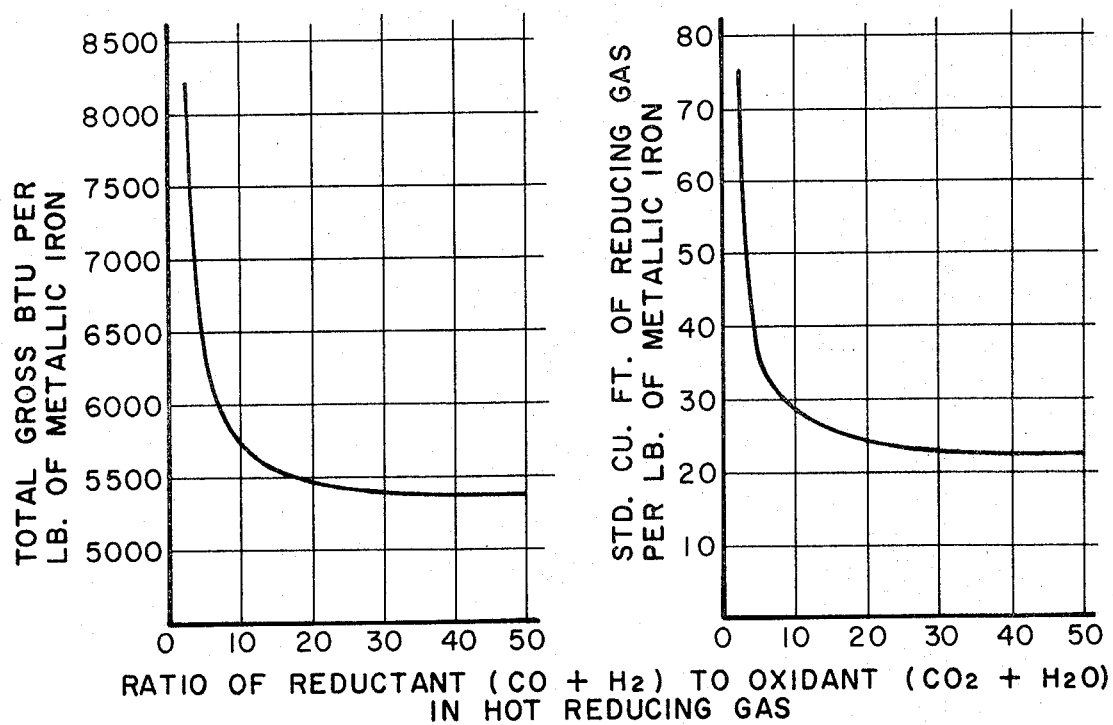
RATIO OF REDUCTANT (CO + H₂) TO OXIDANT (CO₂ + H₂O)
IN HOT REDUCING GAS
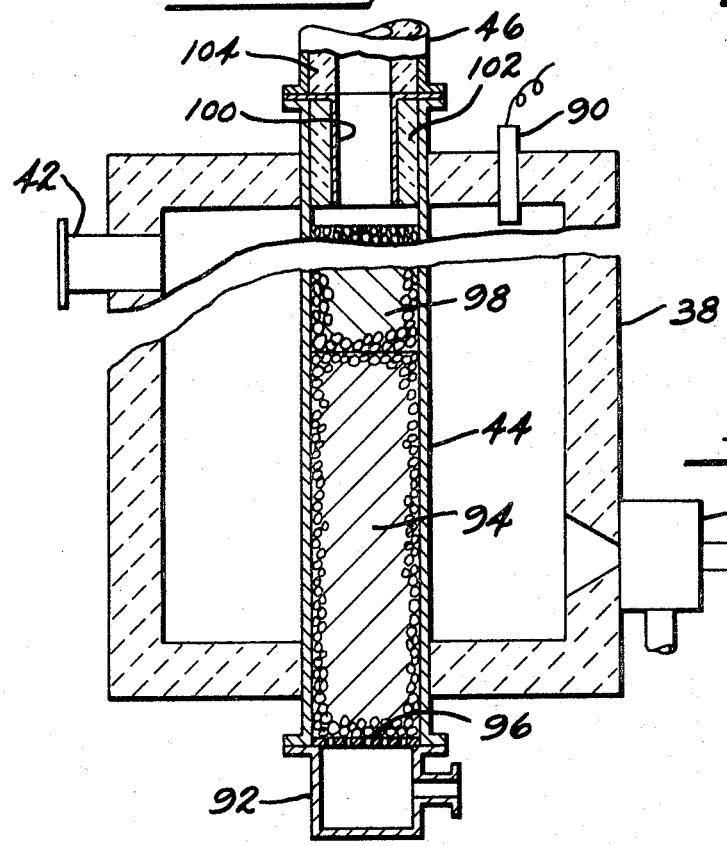
INVENTORS
DONALD BEGGS
JOHN C. SCARLETT
BY
ATTORNEY United States Patent Office 3,748,120
Patented July 24, 1973

ABSTRACT OF THE DISCLOSURE

This invention relates to a method and apparatus for reducing iron oxide to metallic iron, utilizing a continuous process employing a reducing gas with a high $H_2$ and CO content made by catalytically reforming a mixture of gaseous hydrocarbon and reacted off-gas from the reduction process. The $CO_2$ plus $H_2O$ present in the reacted off-gas are utilized as the hydrocarbon reforming oxidant, without the addition of reforming oxidant from an external source.

---

This application is a continuation of copending application having Ser. No. 739,377, filed June 24, 1968, now abandoned. The benefit of the filing date is hereby claimed.

This invention relates to the general field of direct reduction of iron oxide materials to produce metallic iron in a solid state, often referred to as sponge iron. Many investigators have done research and development and pilot plant work on a variety of direct reduction processes, utilizing solid carbonaceous materials, fuel oils, or gaseous fuels as the source of reductant. This work has embraced batch processes, semi-continuous processes with cyclic processing conditions, and continuous processes, treating iron oxide in the form of lump ore, a powder, or, in recent years, pellets. Although great amounts of technical effort and money have been expended on the subject in various parts of the world, for the most part, these efforts have failed to yield a commercially acceptable process, either for technical reasons, economic reasons, or both.

In recent years, as the quality control specifications on finished iron and steel have become increasingly more exacting, the need by the iron and steel industries for an economic source of high grade melting stock has correspondingly been increasing. The presence of tramp ingredients, such as copper and tin, in iron and steel scrap, is becoming more and more of a problem to these industries. Metallized pellets or fines, made by direct reduction of iron oxide pellets or fines from iron ore concentrates, which concentrates generally are free of undesirable tramp ingredients, are an ideal melting stock for electric or oxygen blow iron and steel making furnaces. The barrier to utilization of such metallized pellets or fines on a large commercial scale by these industries has been principally the economics of producing metallized pellets or fines with the high degree of metallization necessary for economic direct melting.

This invention further relates to a reduction process in which fresh reducing gas is produced by continuous catalytic reforming a gaseous hydrocarbon such as natural gas, propane or other readily vaporizable hydrocarbon to produce CO and $H_2$, and in which the oxidant utilized for the hydrocarbon reforming is $CO_2$ and water vapor formed in the reduction process. The utilization of $CO_2$ and water vapor which is formed in the reduction process and which is present in reacted off-gas from the reduction process as the reforming oxidant, without the addition of oxidant such as air, oxygen or steam from an external source as is common in the art, coupled with continuous catalytic reforming to produce a reducing gas high in $H_2$ and CO content, is a significant advance in the art of direct reduction which results in optimum thermal efficiency.

It is, therefore, an object of this invention to provide an economic method of reducing iron oxide to metallic iron.

It is another object of this invention to provide an improved process for converting iron oxide pellets to metallized pellets, in a gaseous hydrocarbon catalytic reformer to provide an overall thermal efficiency not heretofore attained in the art.

It is another object of this invention to provide an improved method of catalytically reforming a gaseous hydrocarbon to produce a hot reducing gas having a high reducing potential and having a controlled ratio of reductants to achieve optimum thermal efficiency.

It is another object of this invention to provide a reduction process for reducing iron oxide to metallic iron in which a gaseous hydrocarbon is reformed to produce CO and $H_2$ by utilizing the oxygen removed from the iron oxide in the form of $CO_2$ and $H_2O$ as the oxidant for the reforming of the hydrocarbon.

It is still another object of this invention to provide apparatus for economically converting iron oxide material to the metallic state.

It is another object of this invention to provide a reduction process and apparatus for converting iron oxide pellets to highly metallized pellets, in which the carbon content in the metallized pellets is controlled to a desired level by controling the ratio of reductants to oxidants in the reducing gas.

It is a further object of this invention to provide apparatus for reducing iron oxides, which apparatus includes means for reacting oxidants in the spent gas of the reduction reaction with a hydrocarbon to produce the reducing gas for the reduction.

It is another object of this invention to provide for continuous catalytic reforming of a gaseous hydrocarbon utilizing $CO_2$ as the principal reforming oxidant, in a manner that protects the reforming catalyst from destruction by carbon deposition from the hydrocarbon.

The above and other objects and features of the invention will appear more fully from a consideration of the following detailed description in conjunction with the accompanying drawing, wherein:

FIG. 1 is a schematic illustration of the equipment and showing a flow sheet of the process of the present invention.

FIG. 2 is a cross-sectional view of a reformer furnace used in practicing the invention.

FIG. 3 is a graphic showing the thermal requirements of the overall process under varied operating conditions.

FIG. 4 is a graphic showing of the quantity of reducing gas required for the overall process under varied operating conditions.

A direct reduction process have been found for producing high quality iron and steel making grade metallized pellets, with a high degree of thermal efficiency. This process utilizes the continuous catalytic reforming of a gaseous hydrocarbon, such as natural gas, propane, or other readily vaporizable hydrocarbon, to produce CO and $H_2$ for the reduction process, by utilizing $CO_2$ and water vapor, which has been formed from the reaction of CO and $H_2$ with iron oxide in the reduction process, as the reforming oxidant. The continuous catalytic reforming is accomplished through the use of an indirectly heated catalyst bed. The process is also capable of producing metallized pellets with a controlled carbon content which makes the pellets additionally attractive for melting stock. The process embraces improvements in the technology of catalytic reforming of gaseous hydrocarbon to produce a hot reducing gas with a controlled high reductant content ($H_2$ and CO) relative to oxidant content ($H_2O$ and $CO_2$)

which is important not only with respect to overall thermal efficiency but also with respect to obtaining a high degree of metallization of the pellets in a reasonable processing time.

Referring now to FIG. 1 of the drawing, a vertical shaft type reduction furnace is shown generally at 10, having a feed hopper 12 mounted at the top thereof into which iron oxide pellets 14 or other bodies, compacts, or lumps containing iron oxide are fed. The pellets 14 descend by gravity into the shaft furnace 10 from the hopper 12 through a pellet feed pipe 16. At the bottom of the shaft furnace 10 is a pellet discharge pipe 18. A pellet discharge feeder 20 of conventional type, such as an electric vibrating feeder, is located below the discharge pipe 18 and receives metallized pellets from the discharge pipe 18, thereby establishing gravitational descent of the pellet burden in shaft furnace 10.

At the upper portion of the shaft furnace 10 is a bustle and tuyere system, indicated generally at 22, through which hot reducing gas is introduced to flow upward in counterflow relationship to the pellets 14 and exits from the furnace through the gas off-take pipe 24, as shown by the arrows, located at the top of the furnace. The pellet feed pipe 16 extends below the off-take pipe 24, which geometric arrangement creates a reacted gas disengaging plenum 26 which permits the gas to disengage generally symmetrically from the pellet stockline and flow freely to the off-take pipe.

A closed loop recirculating system, shown generally at 27, is provided at the lower portion of the furnace 10 to cool the pellets prior to their discharge and includes an indirect cooler 28, a recirculating gas blower 30, a gas inlet 32, and a gas outlet 34. The blower 30 is located in an inlet pipe 31 leading from the cooler 28 to the gas inlet 32 which is a gas distributing member located within the furnace 10. The gas outlet 34 is positioned above the gas inlet 32 and is connected to the cooler 28 by a pipe 33.

A reformer furnace 38, having fuel fired burners 40, a flue pipe 42, and a plurality of indirect heat exchanger, catalyst tubes 44, which are externally heated, only one being shown, is utilized to generate hot reducing gas. The reducing gas flows from the catalyst tubes 44 to the bustle and tuyere system 22 through a gas pipe 46, which contains gas analyzer-controller 47.

The reacted gas leaving the shaft furnace 10 through the off-take pipe 24 flows to a gas cooler-scrubber 60 wherein the gas is cooled and scrubbed of dust. Although this cooler-scrubber 60 can be of any conventional type, the preferred type is a direct contact water cooler, such as a counterflow packed tower with the gas flowing upwardly and cooling water flowing downwardly by gravity through the packing. The water dew point temperature of the reacted gas leaving the off-take pipe 24 will be considerably higher than generally prevailing cooling water temperature, and it is desirable for thermal efficiency to condense as much water vapor from the gas as is practical. A counterflow packed tower is very effective in accomplishing this result, since the gas can readily be cooled to substantially the temperature of the cooling water.

A major portion of the cooled reacted gas leaving the cooler-scrubber 60 is fed to a gas compressor 62 through a pipe 64. Natural gas, propane, or other hydrocarbon fuel in gaseous form provided by a fuel source 66 is admixed in a mixer 68 with the cooled reacted gas leaving the compressor 62. The amount of hydrocarbon admixed is controlled by a valve 65 responsive to a gas analyzer-controller 47 which acts to control the $CO_2$ content (or other constituent) in the reformed gas leaving catalyst tubes 44. An inert purge gas is provided for start-up and shut-down. One method of obtaining this purge gas, which is required only intermittently and in relatively small quantities, is to withdraw and cool a portion of the products of combustion being generated in the reformer furnace 38 by the burners 40. This may be accomplished by a line 69 leading from the reformer furnace 38 to the mixer 68, which line has a valve 70 and cooler 71 therein.

A pipe 72 provides communication between the pipe 64 and the burners 40, through which pipe the balance of the cooled and scrubbed gas flows to the burners in order to utilize the fuel contained within the surplus gas. Located within the pipe 72 is a vent 73, a valve 74, and a pressure sensing element 76. The heating value of the excess cooled reacted gas that is burned in burners 40 is not enough to satisfy all of the heat demand for the reformer furnace 38. Supplemental fuel, which can be any suitable available fuel such as fuel oil or natural gas, is provided to the burners 40 by a supplemental fuel source 78 which is connected to the pipe 72 by a line 79 having a flow control valve 81 therein.

Combustion air for the burners 40 in the reforming furnace 38 is supplied by a suitable air blower 80. The reformer furnace 38 is normally operated at a temperature of 1800° F. to 1900° F. At this furnace operating temperature, it is economically worthwhile to provide a recuperator 82 to preheat the combustion air for the burners 40, to a temperature in the order of 800° F. to 1400° F., by heat exchange with the hot flue gas leaving reformer furnace 38 via the flue pipe 42. This preheated air is carried to the burners 40 through a pipe 84 leading from the heat exchanger 82 and minimizes the quantity of supplemental fuel required for the process from the fuel source 78. The recuperator 82 is provided with a vent pipe 86 through which the flue gases are exhausted.

The flow of supplemental fuel from the source 78 is automatically controlled by the flow control valve 81 located in line 79 in response to a temperature control element 90 located in the reformer furnace 38. Conventional air/fuel ratio control equipment, not shown, is utilized to apportion the flow of combustion air to burners 40 in response to the flow and B.t.u. values of the reacted gas and supplemental fuel being supplied to the burners.

In the case where the reacted gas in pipe 24 is not excessively dust-laden, the portion of this gas which is fed to the burners 40 of the reformer furnace can bypass the cooler-scrubber 60, as indicated by the line 72' shown dotted. The burners 40 will tolerate some amount of dust, whereas the reacted gas supplied to the reformer tubes 44 sohuld be as dust-free as is practical to attain, to avoid blinding of the catalyst bed.

Referring to FIG. 2, which shows details of a preferred arrangement of the reformer furnace 38, a mixture inlet connection 92 is secured by suitable means to the lower end of the catalyst tube 44. The catalyst tube 44 is made of heat resisting alloy, preferably of a grade suitable for operating service in the temperature range of 1700° F. to 2000° F. To preheat the mixture to reforming temperature, the gas inlet end of the tube 44, which in the drawing is shown at the bottom, but which could, if desired, be at the top end, is packed with non-catalytic refractory lump 94 supported on a suitable screen 96. Downstream of the refractory lump 94 is a bed of catalyst 98, which is generally a nickel bearing catalyst. At the exit end of the catalyst tube 44 is a heat resisting alloy insert 100 which is lined with insulation 102 that serves to reduce radiation heat losses at the exit end of the tube. The pipe 46 is attached to insert 100 and transports hot reducing gas to the shaft furnace 10. The pipe 46 is preferably lined with suitable insulating brick 104 to minimize heat losses.

The temperature of the hot reducing gas leaving catalyst tubes 44 will generally be at a temperature 200° F. to 300° F. higher than that which is preferred for operation of the shaft furnace 10. In order to cool the reducing gas to a controlled temperature for introduction to the shaft furnace 10, a portion of the cooled reacted gas in pipe 64 is blended with the hot reducing gas in pipe 46 by means of a control system 48 having a pipe 50, a blower 52, and a gas flow control valve 54 responsive to a temperature sensing element 56. Although other means could be employed to control the temperature of the reducing gas entering the reduction furnace independently of the temperature of the gas leaving the catalyst tubes, the above arrangement is preferred. The recycling into the shaft furnace 10 of a portion of the cooled reacted gas serves to improve the overall process thermal efficiency. The cooled reacted gas has useful reducing value by virtue of its being upgraded in CO and $H_2$ content through the condensing out of some water vapor in cooler-scrubber 60.

For start-up, the reformer furnace 38 is brought to operating temperature by air from the blower 80 and fuel from the source 78, and the shaft furnace 10 is filled with cold oxide pellets. Products of combustion from the reformer furnace 38 are withdrawn through line 69, cooled in the heat exchanger 71, and introduced to the mixer 68. The compressor 62 is then started and the entire system is purged of air by opening the vent 73 in pipe 72. After purging, gaseous hydrocarbon is then gradually admitted to the mixer 68 and reforming is started, utilizing the $CO_2$ and residual water vapor from the products of combustion as the reforming oxidant. After the pellets in the reduction furnace are heated and start to reduce, and $CO_2$ and water vapor are being formed in the reduction furnace, the flow of products of combustion to the mixer 68 through line 69 is cut off. When the reacted gas from the reduction furnace has attained an adequate Btu value to be burned in the reformer furnace, the vent 73 in pipe 72 is closed and valve 74 is opened.

The hydrocarbon admitted to the mixer 68 from the source 66 is reformed in the catalyst tubes 44 to produce CO and $H_2$ by reacting it with $CO_2$ and residual water vapor in the cooled reacted gas being fed to the mixer 68 from the compressor 62. The amount of hydrocarbon admitted should preferably be close to, but not exceed, that which is required for stoichiometric reaction with the $CO_2$ and water vapor in the cooled reacted gas. The amount of cooled reacted gas fed from the compressor 62 is controlled at a desired rate. Likewise, the flow of the hydrocarbon is controlled to maintain the desired ratio, with respect to the flow of cooled reacted gas. Thus, the major portion of the oxidant required for reforming is supplied by the iron oxide pellets. During start-up, the blower 80 acts as the original source of oxidant, but after reduction of the pellets and valve 70 is closed, the required oxidant comes from the pellets.

The hot reducing gas, comprising CO and $H_2$ produced in the reformer furnace 38, is carried by the pipe 46 to the bustle and tuyere system 22 and into the shaft furnace 10 wherein it serves to heat and reduce the pellets. The temperature of the reducing gas is preferably maintained between about 1300° F. and 1450° F. by the control system 48 to avoid sticking of the metallized pellets. The reducing gas reacts with the iron oxide pellets, thereby metallizing the same and yielding $CO_2$ and $H_2O$. The reacted gas, which still contains an appreciable quantity of $H_2$ and CO, exits from the furnace through pipe 24 and passes through the scrubber-cooler 60. The scrubber 60 removes a substantial portion of the water and dust from the reacted gas. The major portion of the scrubbed gas is conveyed through the blower 62 to the mixer 68 where it mixes with hydrocarbon from the source 66. The mixture then passes through the heated catalyst tubes 44 where the $CO_2$ and $H_2O$ react with the hydrocarbon to produce the reducing gas for the reduction furnace. Thus a closed system is provided wherein the oxidant required to react with the hydrocarbon to produce the reducing gas is supplied by the iron oxide being reduced with no dependence of an external source of oxidant.

The ratio of reductant (CO plus $H_2$) to oxidant ($CO_2$ plus $H_2O$) is preferably maintained at 9:1 or greater by gas analyzer-controller 67 which serves to control the flow of hydrocarbon to mixer 68.

In the chemistry of hydrocarbon reforming, each cubic foot of $CO_2$ reacted with carbon in the hydrocarbon produces two cubic feet of CO, and each cubic foot of water vapor reacted with carbon in the hydrocarbon produces one cubic foot of CO and one cubic foot of $H_2$. In addition to this volume expansion, the hydrogen radical in the hydrocarbon is converted to $H_2$ which is an additional volume expansion. Thus, there is a considerably greater standard volume of gas leaving the catalyst tubes in pipe 46 than that entering the catalyst tubes from the mixer 68.

During the reduction reactions, which take place in the shaft furnace 10, the reducing gas supplied to the furnace undergoes no volume change before exiting at off-take pipe 24. Thus, each cubic foot of CO reacted with iron oxide produces one cubic foot of $CO_2$, and each cubic foot of $H_2$ reacted with iron oxide produces one cubic foot of water vapor. Inasmuch as the shaft furnace 10 is essentially sealed at the pellet feed pipe 16 and discharge pipe 18, the volume of gas leaving the furnace through pipe 24 is essentially the same as that entering the furnace through pipe system 46.

In the cooler-scrubber 60, the reacted gas undergoes a shrinkage in volume due to the condensation of some, or most, of the water vapor which has been formed in the shaft furnace 10. This volume shrinkage is, however, considerably less than the volume expansion which occurs during the reforming in the catalyst tubes 44. Thus, there is an excess of cooled reacted gas in pipe 64 as compared to that being handled by compressor 62. This excess gas is utilized as fuel in the burners 40 to provide heat to the reformer furnace 38, and serves to provide a very substantial portion of the heat required by the catalyst tubes 44. It is, thus, preferable to utilize all of the excess cooled reacted gas available. To this end, the gas pressure sensing element 76 is employed to actuate the gas flow control valve 74 in the excess pipe 72 leading from the pipe 64 to automatically impose a back pressure in the pipe 64. This back pressure control system affects at least three operating conditions: first, the compressor 62 is operated with a positive gas pressure at its inlet which improves its pumping efficiency; second, the shaft furnace 10 is operated with a positive pressure in plenum chamber 26 which precludes air leaking into the system through the pellet feed pipe 16. And third, whatever quantity of excess cooled reacted gas is available flows to the burners 40 through pipe 72 due to the controlled positive pressure therein.

Referring to FIG. 3, the total fuel requirement of the overall process is shown as a function of the ratio of reductant (CO+$H_2$) to oxidant ($CO_2$+$H_2O$) in the reducing gas. The total fuel requirement is expressed in terms of B.t.u. per pound of metallic iron produced in the reduction furnace, based on converting high grade hematite iron oxide pellets to highly metallized pellets. The graph indicates the thermal advantage of producing a reducing gas having a high ratio of reductant to oxidant. It is noteworthy that at the ratio of reductant to oxidant of approximately 9:1, the curve breaks sharply upwardly.

Referring to FIG. 4, the quantity of reducing gas that must be supplied for the process, per pound of metallic iron produced, is shown as a function of the ratio of reductant to oxidant in the reducing gas. The quantity of reducing gas that must be supplied for the process has a marked influence on the size of the reformer 36, on the size of the shaft furnace 10, and on the size of and amount of horsepower that must be provided for the compressor 62 which in effect runs the process.

With regard to the basic process of direct reduction, the reduction of hematite ($Fe_2O_3$) to metallic iron (Fe) with carbon monoxide or hydrogen takes place in stages according to the following reactions, each based on one mol of iron:

(1) $\frac{1}{2}Fe_2O_3 + \frac{1}{6}CO = \frac{1}{3}Fe_3O_4 + \frac{1}{6}CO_2$
(2) $\frac{1}{3}Fe_3O_4 + \frac{1}{3}CO = FeO + \frac{1}{3}CO_2$
(3) $FeO + CO = Fe + CO_2$ and (4) ½Fe$_2$O$_3$+⅙H$_2$=⅓Fe$_3$O$_4$+⅙H$_2$O
(5) ⅓Fe$_3$O$_4$+⅓H$_2$=FeO+⅓H$_2$O
(6) FeO+H$_2$=Fe+H$_2$O In any practical direct reduction process, the reductants CO and/or H$_2$ in the reducing gas cannot be reacted to exhaustion in the reduction furnace because of the oxidants CO$_2$ and H$_2$O which are formed as the reduction proceeds. The end limit of utilization of the CO and/or H$_2$ in the reduction step is defined by an equiligrium ratio of CO to CO$_2$ and of H$_2$ to H$_2$O. This ratio can be determined experimentally or by calculation from published thermodynamic data. As an example, the ratios for Equations 1 through 6 above are as follows at 1400° F.:

(1) CO/CO$_2$=1×10$^{-5}$
(2) CO/CO$_2$=.62
(3) CO/CO$_2$=1.65 and (4) H$_2$/H$_2$O=1.4×10$^{-5}$
(5) H$_2$H$_2$O=.70
(6) H$_2$/H$_2$O=2.0

In a counterflow shaft type reduction furnace, which type furnace is particularly adaptable for a three to four hour solids retention time in the reduction zone as well as excellent gas/solids contact, the above reactions can be made to proceed substantially to equilibrium. The graphs shown in FIGS. 3 and 4 are based on the reactions proceeding to equilibrium in the reduction furnace, and utilizing typical high methane natural gas as the source of gaseous hydrocarbon for the reformer. The graphs are also based on sound engineering practice of those skilled in the art of proper sizing and design of major components shown in FIG. 1 such as the shaft furnace 10, the reformer furnace 38, and the heat exchanger 82.

With regard to the general subject of gaseous hydrocarbon reforming, steam is widely used as a reforming oxidant. In the process of the present invention, CO$_2$ is used as the principal reforming oxidant. Re forming with steam (H$_2$O) is highly endothermic. Reforming with CO$_2$ is even more endothermic. Reforming with air is much less endothermic. The following are well known reforming reactions, based on the gaseous hydrocarbon methane (CH$_4$) which is the principal hydrocarbon in natural gas:

(1) CH$_4$+H$_2$O=CO+3H$_2$

Endothermic heat* is 349 B.t.u./cu. ft. of CH$_4$ reformed (2) CH$_4$+CO$_2$=2CO+2H$_2$ Endothermic heat* is 397 B.t.u./cu. ft. of CH$_4$ reformed (3) CH$_4$+½O$_2$+2N$_2$=CO+2H$_2$+2N$_2$ Endothermic heat* is 103 B.t.u./cu. ft. of CH$_4$ reformed In the catalytic reforming of gaseous hydrocarbon with steam, it is common practice in the art to utilize a steam/hydrocarbon ratio considerably in excess of stoichiometric proportions, in order to avoid carbon deposition and accompanying physical destruction of the reforming catalyst. Reforming with a considerable excess of oxidant produces a reformed gas having a relatively low ratio of ---
*The endothermic heat requirement is based on a 77° F. mixture and reformed gas at 1600° F.

reductants to oxidants. Such reormed gas with a relatively low ratio of reductants to oxidants cannot be utilized for direct reduction of iron oxide to metallic iron with a high degree of thermal efficiency. In order to reform a gaseous hydrocarbon with steam and produce a reformed gas having a high ratio of reductants to oxidants, many investigators have added air or oxygen to the mixture to be reformed, presumably to lessen the endotherimc heat requirement.

In addition to conceiving and developing the present overall reduction process shown in FIG. 1, the inventors have found and developed the process means and apparatus for accomplishing the continuous catalytic reforming of a gaseous hydrocarbon to produce a reformed gas having a high ratio of reductants to oxidants, utilizing the CO$_2$ and water vapor present in reacted off-gas from the reduction process as the reforming oxidant.

A first process requirement that has been found to be important with reference to the reforming of reacted gas from the reduction process is that the mixture to be reformed ought to be preheated to a temperature of at least about 1500° F. prior to its contacting the catalyst, in order to protect the catalyst from carbon deposition disintegration. The mixture to be preheated and subsequently reformed will contain major amounts of CO, CO$_2$, H$_2$, a lesser amount of H$_2$O, and the gaseous hydrocarbon. In preheating such a mixture, the CO is subject to breaking down and depositing carbon in the temperature range of about 600° F. to 1200° F. by the well known reaction: 2CO=CO$_2$+C. In addition, the hydrocarbon is subject to thermal cracking to deposit carbon and liberate H$_2$ at temperatures above about 1200° F. In order to successfully accomplish the mixture preheating without troublesome carbon deposition, it has been found that the heat exchanger used for preheating should be of a refractory material which is non-catalytic both to CO breakdown and to thermal cracking of hydrocarbon. Fused aluminum oxide lump is a refractory material which proved very successful. It is believed that most metal oxides which cannot be reduced to the metallic state by CO or H$_2$ under the operating conditions prevailing in the preheater would be suitably non-catalytic, as for example magnesium oxide, silicon oxide, and chromium oxide.

A second process requirement that has been found to be important with reference to the reforming of reacted gas is that the reforming catalyst should be maintained at a temperature of at least about 1500° F. to avoid physical destruction by carbon deposition in the catalyst pores. Inasmuch as a bed of catalyst lump is not a very good conductor of heat and the reforming reaction with CO$_2$ as the principal reforming oxidant is highly endothermic, the core of a catalyst bed in a reformer tube operates much colder than the temperature of the tube wall. Referring to FIG. 2, it was found that with an 8" diameter tube 44, and with nominal 1" to 1½" diameter catalyst lump 98, the reformer furnace 39 should be operated at a temperature of about 1800° F. to 2000° F. to maintain a tube wall temperature of about 1700° F. to 1900° F. to avoid catalyst destruction at the core region of tube. With a smaller diameter tube, these temperatures might be reduced somewhat.

The preferred catalyst lump 98 is one with both good thermal conductivity and good porosity. High purity tabular alumina impregnated with 5% to 10% nickel has been found to be a preferred type of catalyst.

With regard to the overall process of FIG. 1, the following are representative gas analyses on a wet volume basis of the hot reducing gas, the reacted off-gas from the reduction furnace, the cooled and scrubbed reacted gas, and the mixture supplied to the reformer tubes. These analyses are based on data obtained using a high methane natural gas as the gaseous hydrocarbon. For purposes of this tabulation, the hydrocarbon prior to being reformed is expressed as methane. In the tabulation, the corresponding location in FIG. 1 is indicated.

| | CO | $H_2$ | $CH_4$ | $CO_2$ | $H_2O$ | $O_2$ | $N_2$* |
|---|---|---|---|---|---|---|---|
| Mixture to reformer tubes (in mixer 68) | 26.6 | 36.6 | 15.3 | 19.0 | 0.8 | 0.0 | 1.7 |
| Reducing gas (in pipe 46) | 46.2 | 48.8 | 0.2 | 1.8 | 1.2 | 0.0 | 1.8 |
| Reacted gas (in pipe 24) | 27.1 | 37.4 | 0.4 | 19.4 | 14.0 | 0.0 | 1.7 |
| Cooled reacted gas (in pipe 64) | 31.2 | 43.1 | 0.5 | 22.3 | 0.9 | 0.0 | 2.0 |

* Not measured, obtained by difference.

With 46.2% CO, 48.8% $H_2$, 1.8% $CO_2$, and 1.2% $H_2O$ in the above reducing gas, the ratio of reductants to oxidants is approximately 32:1. The B.t.u. value of the reacted gas is approximately 213 B.t.u. per cubic foot. The B.t.u. value of the upgraded cooled reacted gas is approximately 246 B.t.u. per cubic foot. This data was taken during winter operation with a cooling water temperature of approximately 40° F. to the cooler-scrubber, which accounts for the very low residual $H_2O$ content in the cooled reacted gas. With warmer water to the cooler-scrubber, the $H_2O$ content in the cooled reacted gas would, of course, be correspondingly greater.

It is desirable both from an overall process thermal efficiency standpoint and from a reforming standpoint, to avoid significantly diluting the CO and $H_2$ content in the reacted gas, as would occur if a reforming oxidant such as air from an external source were added in any appreciable amount to the mixture to be reformed. With regard to thermal efficiency, the greater the percentage of CO and $H_2$ in the mixture to be reformed, the less the amount of hydrocarbon that must be added to the mixture to produce a given quantity of hot reformed gas of a given CO and $H_2$ content. With regard to the reforming itself, the greater the ratio of $H_2$ to hydrocarbon in the mixture to be reformed, the less inherent tendency there is for carbon deposition to occur in the reforming catalyst. Hydrogen in the mixture to be reformed acts to suppress thermal cracking of hydrocarbon to carbon and hydrogen when the mixture is heated.

Although it is undesirable to add oxidant from an external source to the mixture to be reformed, the process of the present invention has been operated successfully with the addition of air to the mixture in an amount up to about 15% by volume. Presumably a small amount of steam could also be added if it were desired to increase the $H_2$ to CO ratio in the reformed gas.

The continuous reforming of the present invention enables stable reforming conditions to be maintained, which is important not only for long catalyst life, but also allows close control of the quality of the reformed gas, particularly with reference to the ratio of reductant to oxidant.

Regarding the iron oxide reduction phase of the process, a considerable number of extended laboratory runs were made in a shaft type reduction furnace similar to that shown in FIG. 1. Hematite oxide pellets made from high grade iron ore concentrates and having a nominal diameter of ⅜" to ⅝" were utilized for these runs. A reduction temperature of approximately 1450° F. was found to be preferred, since at a temperature of 1500° F. a tendency was found for the pellets to stick together and form clusters which interfered with free-flowing descent of the pellet burden in the shaft furnace. At a reduction temperature of 1450° F., and with cold oxide pellets charged to the shaft, a pellet residence time from the stockline to the region of introduction of the 1450° F. reducing gas of approximately four hours was found to be ample to produce pellets having 95% to 97% metallization (95% to 97% of the total iron being metallic iron). Highly metallized pellets were produced having different levels of carbon, by varying the ratio of reductant to oxidant in the hot reducing gas. This ratio can be controlled by controlling the ratio of hydrocarbon to oxidant in the mixture being reformed. With a reductant to oxidant ratio of approximately 50:1, the pellets contained approximately 2.0% carbon. With a ratio approximately 20:1, the pellets contained approximately 0.5% carbon. With a ratio of 9:1, the carbon content will be substantially zero. In addition to controlling the ratio of reductant to oxidant in the hot reducing gas, a controlled amount of gaseous hydrocarbon can be added to the hot reducing gas prior to its introduction to the reduction furnace, to effect the desired carbon content in the metallized pellets.

It is believed desirable to have carbon in the metallized pellets in an amount that is at least enough to reduce residual iron oxide in the pellets to metallic iron while the pellets are being melted. Carbon in the pellets appears to react very efficiently to reduce the residual iron oxide during melting. For example, in the melting in an electric arc furnace of some 20 tons of 96% metallized pellets containing an average of approximately 1.5% carbon, it was found that 99% of the total iron in the pellets showed up in the steel produced. The carbon in these pellets was present partly as free carbon in the pores of the pellets and partly as iron carbide.

The overall reduction process shown in FIG. 1 has been described specifically with reference to the reduction of iron oxide pellets in a shaft type reduction furnace; however, the overall process is also applicable to other forms of iron oxide containing bodies such as lumps or fines and to other types of reduction equipment such as conveyor furnaces and fluidized bed cells, where the reacted gas can be captured and recycled without excessive air dilution.

Although only a few embodiments of this invention have been shown and described, it is understood that changes and modifications can be made therein, and this description is illustrative only and not for the purpose of rendering this invention limited to the details illustrated or described except insofar as they are limited by the terms of the following claims.

We claim:

1. In a method of producing metallized pellets by the gaseous reduction of iron oxide particulates, the steps comprising: establishing a gravitational flow of iron oxide particulate material by feeding the particulate material to the upper portion of a generally vertical furnace and removing the particulate material from the bottom thereof, introducing a reducing gas consisting essentially of $H_2$ and CO and at a temperature of at least 1500° F. to the gravitational flow of materials at a first inlet intermediate the ends of the furnace, removing the off-gas from the upper portion of the furnace after the same has passed through the iron oxide particulates, passing the off-gas through a scrubber-cooler, separating the off-gas after it passes through the scrubber-cooler into two portions, mixing a first portion of said cooled scrubbed off-gas with a hydrocarbon, heating a tube containing catalyst to a substantially constant temperature between 1700° F. to 2000° F. to indirectly heat the catalyst, directing the mixture through the tube containing catalyst, thereby reforming the oxidants in the off-gas and the hydrocarbon to form CO and $H_2$, and directing the reformed gas from the tube to said first inlet.

2. The method of claim 1 wherein a cooling gas is introduced to a second inlet located at the lower end of said furnace, removing the cooling gas at a location intermediate the first and second inlets, reducing the temperature of the extracted cooling gas, and directing the cooling gas back into the second inlet, thereby establishing a closed cooling circuit.

3. The method of claim 1 wherein the amount of hydrocarbon mixed with the first portion of off-gas is controlled to provide a substantially stoichiometric ratio between the oxides in the off-gas and the hydrocarbon in the reforming of the oxides and hydrocarbon to form CO and $H_2$.

4. The method of claim 1 wherein the temperature of the reformed gas directed from the tube to said first inlet is maintained between about 1300° F. and 1400° F.

5. The method of claim 1 wherein the formation of elemental carbon in the reduced iron bed is prevented by maintaining the ratio of reductants to oxidants in the reducing gas at about 9:1.

6. The method of claim 1 wherein the mixture of hydrocarbon and off-gas is passed through a non-catalytic environment in the tube and heated to a temperature from 1700° F. to 2000° F. before the mixture is passed through the catalyst.

References Cited

UNITED STATES PATENTS

| | | | |
|---|---|---|---|
| 3,660,492 | 5/1972 | Tompkins | 252—463 X |
| 3,375,098 | 3/1968 | Marshall | 75—35 |
| 2,767,076 | 10/1956 | Taylor | 75—34 |
| 2,971,752 | 2/1961 | Madaras | 75—35 UX |
| 2,739,055 | 3/1956 | Gallusser | 75—35 X |
| 3,375,099 | 3/1968 | Marshall | 75—35 |
| 3,591,364 | 7/1971 | Reynolds et al. | 75—35 X |
| 3,607,225 | 9/1971 | Hatarescu et al. | 75—35 |
| 3,160,498 | 12/1964 | Olt et al. | 75—35 X |
| 2,807,535 | 9/1957 | Segre | 75—35 |
| 2,988,442 | 6/1961 | Tanner | 75—34 |

L. DEWAYNE RUTLEDGE, Primary Examiner

M. J. ANDREWS, Assistant Examiner

UNITED STATES PATENT OFFICE
CERTIFICATE OF CORRECTION

Patent No. 3,748,120      Dated July 24, 1973

Inventor(s) Donald Beggs and John C. Scarlett

It is certified that error appears in the above-identified patent and that said Letters Patent are hereby corrected as shown below:

Column 1, line 54, delete "blow" and substitute therefor -- blown --.

Column 2, line 4, delete "economic" and substitute therefor -- economical --. Line 50, after "showing" insert -- of --.

Column 4, line 43, delete "sohuld" and substitute therefor -- should --.

Column 5, line 69, delete "of" first occurrence and substitute therefore -- on --.

Column 7, line 12, delete "equiligrium" and substitute therefor -- equilibrium --. Line 46, delete "Re forming" and substitute therefor -- Reforming --.

Column 8, line 1, delete "reormed" and substitute therefor -- reformed --. Line 8, delete "endotherimc" and substitute therefor -- endothermic --. Line 56, delete "39" and substitute therefor -- 38 --.

Column 10, line 21, delete "ract" and substitute therefor -- react --.

Claim 1, line 8, change "1500°F." to -- 1300°F. --

Claim 4, line 3, change "1400°F." to -- 1450°F. --.

Signed and sealed this 26th day of March 1974.

(SEAL)
Attest:

EDWARD M. FLETCHER, JR.
Attesting Officer

C. MARSHALL DANN
Commissioner of Patents